United States Patent Office 2,820,416
Patented Jan. 21, 1958

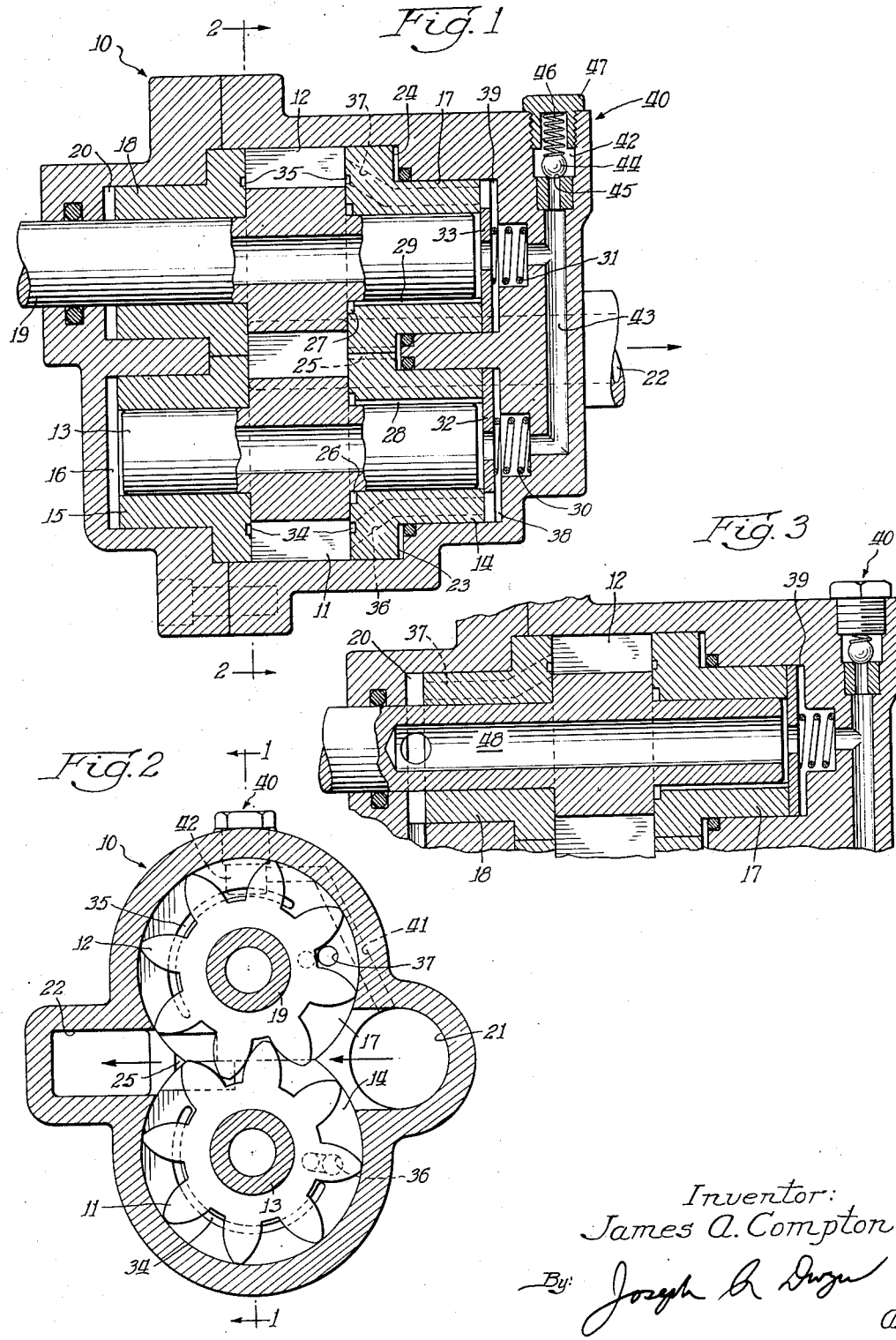

2,820,416

PRESSURE LOADED PUMP

James A. Compton, Euclid, Ohio, assignor to Borg-Warner Corporation, Chicago, Ill., a corporation of Illinois Application December 24, 1952, Serial No. 327,792

10 Claims. (Cl. 103—126)

This invention relates to a gear pump, and more particularly to a gear pump of the type employing pressure loaded bushings, such gear pumps sometimes being referred to as pressure loaded pumps.

In a pressure loaded gear pump of the type including at least one set of axially movable, pressure loadable bushings, a part of the discharge pressure generated by the pump is communicated to the rear or motive surfaces of the axially movable bushings to urge these bushings into sealing relationship with their associated gears. As disclosed in the U. S. Patent No. 2,420,622 to Lauck et al., by carefully selecting the relative sizes of the area of the forward surfaces of the bushings and of the motive surfaces of the bushings, and particularly by controlling the area of the forward surface of the bushing exposed to discharge pressure, it is possible to control, within very close limits, the actual sealing pressure established during operation of the pump. Gear pumps, so constructed, are capable of delivering fluid at extremely high presssure with considerable volume.

Gear pumps when operated under adverse inlet conditions as, for example, at high altitudes with relatively low inlet pressure, may be subject to inadequate filling of the gear tooth pockets. In pressure loaded gear pumps of the type referred to above, due to the exceptionally high efficiency and consequently low leakage from discharge to inlet, adverse inlet conditions are, under some circumstances, aggravated. Thus, whereas in a gear pump of low efficiency the leakage back to the inlet side of the pump from the discharge side is sufficiently great to tend to compensate for inadequate filling of the gear tooth pockets due to adverse inlet conditions, in pressure loaded type pumps the leakage is reduced to such an insignificant factor as to be inadequate to compensate for such insufficient filling of the gear tooth pockets. One result of inadequate filling of gear tooth pockets is to cause the pump to become noisy in operation, and also, where the condition is serious, to increase the rate of wear.

An object of the present invention is to provide a new and improved type of gear pump wherein filling of the gear tooth pockets, even under adverse conditions, is assured.

A further object of the present invention is to provide a new and improved type of pressure loaded gear pump wherein intermediate pressure within the pump housing is utilized to complete the filling of the gear tooth pockets, whereby to reduce noise and wear.

In accordance with this invention as applied in a pressure loaded gear pump of the type discussed in the aforementioned Lauck et al. Patent No. 2,420,622, a passage is formed in at least one set of the bushings and located so as to communicate with the gear tooth pockets adjacent the inlet pump at one end and at the other end with a zone of intermediate pressure, i. e., a pressure lower than discharge pressure but higher than inlet pressure.

The bore extensions in which the tubular portions of the flanged bushing are housed normally contain intermediate pressure because the relief recesses are vented to these extensions by axial grooves or passages extending along the inner surface of the tubular portions or bores of the bushings or by the usual clearance between the gear journals and bushing bores. These bore extensions, sometimes referred to as seal chambers, perform the function of housing the springs which cause initial sealing engagement of the bushings with the gear side faces and also provide proper lubrication for the journals. It is this intermediate pressure normally maintained in these seal chambers that is placed in communication with the gear tooth pockets to insure proper filling thereof.

In one embodiment, this passage may be formed in each of the movable or pressure loaded bushings, and communicates at its inlet with the seal chamber which is maintained through a suitable relief valve arrangement at a pressure slightly higher than inlet pressure but lower than discharge pressure.

In another embodiment, this passage may be formed in each of the fixed or body bushings and communicates at its inlet with this seal chamber which is maintained at an intermediate pressure.

Other objects and advantages of this invention will be apparent from the following detailed description taken in conjunction with the drawings wherein:

Fig. 1 is an axial sectional view of a pressure loaded pump constructed in accordance with one embodiment of this invention showing the arrangement of the passage formed in the pressure loaded bushings; the figure being taken substantially along line 1—1 of Fig. 2;

Fig. 2 is a transverse sectional view taken along line 2—2 of Fig. 1; and

Fig. 3 is a detailed sectional view, similar to Fig. 1, of another embodiment of this invention showing the arrangement of the passages formed in the fixed or body bushings.

Referring to the drawings, the numeral 10 denotes a suitably chambered gear pump housing in which are rotatably mounted a driven gear 11 and an intermeshing driving gear 12. Driven gear 11 is supported on a shaft 13 journalled on its right side through a pressure responsive, axially movable, flanged bushing 14 and on its left side through a fixed, flanged body bushing 15. The gear 11 and associated bushings 14 and 15 are arranged in a first chamber 16 formed in the pump housing 10 with sufficient clearance between the right end of the bushing 14 and an adjacent end wall of the housing to permit axial movement of the bushing 14. Similarly, the driving gear 12 has disposed on its right side a pressure responsive, axially movable, flanged bushing 17 and on its left a fixed flanged body bushing 18. Driving shaft 19, on which gear 12 is mounted, is journalled through the bushings 17 and 18 and may be suitably connected to any driving means (not shown). The gear 12 and associated bushings 17 and 18 are located in a second chamber 20 formed in the housing 10 adjacent and parallel to chamber 16. Sufficient clearance is provided between the right end of the bushing 17 and the adjacent wall of the housing to permit axial movement of the bushing 17.

As shown in Fig. 2, the housing has an inlet port 21 formed on its right side and an outlet 22 formed on its left side. Pressure generated by the gears is communicated from the outlet or discharge side of the pump to the motive or pressure responsive surfaces 23 and 24 of the axially movable bushings 14 and 17 through an axially extending passage 25 provided between the peripheries of the flanged portions of the bushings 14 and 17 adjacent the discharge side of the pump at the point of convergence of the bushings. It has been found in practice possible to fit the housing 10 closely enough to the converging peripheries of the bushings opposite from the passage 25 to prevent recirculation of fluid pressure to the inlet side of the gear tooth.

As disclosed in the aforementioned U. S. Patent No. 2,420,622, recesses 26 and 27 of annular configuration are formed either in the radially inner terminal portions of the forward or gear engaging surfaces of the axially movable pressure loaded bushings 14 and 17 or in the gear side faces radially inwardly of the roots of the gear teeth. These relief recesses are usually placed in communication with the low pressure or inlet port of the pump through the usual clearance between the gear journals and the bushing bores or through axially extending channels or grooves 28 and 29 formed in the bores of bushings and control the effective pressure area of the flanged bushings. In this manner the axial force resulting from the pressure generated by the pump acting across the gear side face engaging surfaces of the bushings 14 and 17 tending to produce axial movement of the bushings away from the gear side faces are effectively controlled and overcome by the oppositely directed pressure loading force communicated to the rear surfaces of the bushings, which latter axial force is made to slightly exceed the first mentioned axial force and thereby proper sealing engagement with the gear side faces is maintained.

To provide an initial seal between the bushings and the gears, coiled compression springs 30 and 31 are disposed within the right ends of the chambers 16 and 20, respectively, so as to seat against washer-like plates 32 and 33 adjacent the right end or barrel portion of the bushings 14 and 17 to urge the forward faces of these bushings into engagement with the gear side faces.

While the loading pressure will be substantially uniformly distributed over the motive surfaces of the pressure responsive bushings 14 and 17, there will be a very definite pressure gradient between the portion of the bushing adjacent the inlet 21 and a portion of the bushing adjacent the outlet 22, this latter being, of course, subject to higher or discharge pressures. It has been found also that the journal loads on the driving gear are substantially less than the journal loads on the driven gear due primarily to the fact that driving loads deduct from the driving gear bearing loads and add, by a like amount, to the driven gear bearing loads. This uneven or unbalanced condition results in greatly increasing the wear and reducing the usual life of the pump. However, by providing balancing grooves 34 and 35 this problem of pressure gradient and uneven bearing loads is substantially overcome. Attention is invited to Fig. 2 where it is shown that the balancing grooves are of unequal length, with the longer balancing grooves associated with the bushings of the driven gear and are positioned so that the terminals of both balancing grooves are nearest the discharge side of the pump. Particular detail of the precise structure and function of these balancing grooves is disclosed in the co-pending United States application Serial No. 120,349 of Boris P. Ilyin filed October 8, 1949, now Patent No. 2,624,287. Since this application is concerned primarily with the proper filling of the gear tooth pockets and not with these balancing grooves, it is deemed that no more detail than that already set forth is sufficient. It is to be understood, too, that the invention to which this application is directed can be used in any pump of the type disclosed with or without the balancing grooves as taught by Ilyin.

It can be readily understood that with the structure as above described fluid can be delivered at extremely high pressure with considerable volume. However, because of the exceptionally high efficiency and consequently low leakage from the discharge to the inlet, there is little compensation for adverse inlet conditions such as low inlet pressure. Inadequate filling of the gear tooth pockets without proper means to compensate for this inadequacy will cause the pump to become noisy in operation and increase the rate of wear.

It is the purpose of the present invention to overcome the aforementionel difficulty by providing a suitable way of filling these gear tooth pockets so that hydraulic lock, erosion and wear will be minimized. It is well known that, although there is little leakage from the discharge side to the inlet side of the pump, a small amount of fluid is forced, during normal operation, radially inwardly toward the annular recesses 26 and 27 and is vented through the grooves 28 and 29 or through the usual clearance between the gear journals and the bushing bores to the terminal ends of the bushings.

Heretofore, in pressure loaded pumps, the seal chambers defined by the terminal ends or bore extensions of the bushings and the end walls of the housing have been used merely to permit axial movement of the bushings and have housed associated bushing springs which are provided to insure initial seal, any slight fluid pressure that is built up from the pressure communicated from the annular recesses being used to insure proper lubrication of the bushings. In accordance with the present invention, it is proposed that the fluid in these seal chambers be utilized to fill these gear teeth.

It can be understood that, under adverse inlet conditions such as, for example, at high altitudes where the inlet pressure may become relatively low, the gear tooth pockets may be subject to inadequate filling. This will naturally result in a loss of overall pumping efficiency. If discharge pressure, directly from the discharge conduit, were used to fill these teeth, there would be a disadvantage of resultant loss in volumetric efficiency, plus a further disadvantage due to the fact that an attempt to fill the gear teeth pockets with pressure at a value of discharge pressure would cause erosion and hydraulic lock reducing the normal life of the pump. It can be seen, therefore, that if pressure from the seal chambers is utilized to fill the gear tooth pockets, volumetric efficiency is maintained at a high level even during adverse inlet conditions, and, further, this intermediate pressure can be readily introduced into the gear tooth pockets without causing erosion to the gear teeth. This intermediate pressure normally vented to inlet is thus salvaged and given a function in addition to that which it normally performs.

To carry out this proposal in a pressure loaded gear pump of this type, passages are formed in the bushings, either in the axially movable bushings, or in the fixed or body bushings, so that pressure lower than discharge pressure but higher than inlet pressure can be communicated to the gear tooth pockets, and it has been found, in practice, that this pressure, available from the annular recesses adjacent the gear side faces, is sufficient to insure adequate filling of the gear teeth.

Specifically, attention is invited to Figs. 1 and 2 where there is shown passages 36 and 37 formed in the axially movable bushings 14 and 17 of the driven and driving gears, respectively. The inlet of each of these passages communicates with the right end portions, or seal chambers 38 and 39, of the chambers 16 and 20 formed in the housing. In this invention, these seal chambers 38 and 39 or end portions are maintained at an intermediate pressure higher than inlet pressure but less than discharge pressure by a ball poppet valve system, generally indicated at 40, this intermediate pressure being selected to be sufficient in amount to insure filling of the gear tooth pockets through passages 36 and 37. These seal chambers or end portions 38 and 39 are connected to the inlet port 21 through the valve assembly 40 and conduit 41 (Fig. 2). Thus, fluid, which is communicated from the annular recesses 26 and 27 through the grooves 28 and 29 or through the usual clearance between the gear journals and bushing bores, is conducted into the valve chamber 42, of valve assembly 40, through conduit 43 and out through conduit 41 to the inlet 21. The valve assembly 40, which regulates the pressure within the seal chambers 38 and 39, comprises a spring actuated ball poppet 44 normally seated against the orifice 45 leading to the chamber 42. Helically coiled spring 46 seats at one end against the ball poppet 44 and at the other end against a peripherally threaded cap 47 suitably threaded into the free portion of the valve chamber 42 to permit adjustment of the spring and resulting regulation of the fluid pressure in the seal chambers 38 and 39.

It is apparent that fluid under intermediate pressure, i. e., pressure less than discharge pressure but greater than inlet pressure, vented into the seal chambers 38 and 39 adjacent the terminal portions of the bushings will be suitably regulated by this valve system 40 so that fluid can be communicated through the passages 36 and 37 into the pockets of the gear teeth. In order to obtain the efficiency of these passages and maintain the proper sealing relationship between the bushings and the gear side faces, it has been found in practice, that it is desirable to have as much seal area between the outlet end of the passage and the maximum pumping pressure which, of course, is near the discharge side of the pump, and prevent direct communication between both the outlet side and inlet side of the pump. Thus, the outlets of these passages, as shown in Fig. 2, are disposed near the pockets of the gear teeth and nearer the inlet side than the outlet side of the pump without direct communication between either outlet or inlet.

It is important to note, also, that these passages are formed axially within the barrel portion of the bushings and at an angle through the flanged portion thereof so that pressure communicated from the seal chambers 38 and 39 can be brought directly into the pockets of the gear teeth. In this manner, the pressure in the motive chambers directed against the motive surfaces 23 and 24 of the bushings is not disturbed.

While this invention has been so far described in connection with passages in the axially movable bushings, it is clear that it is equally applicable to the fixed or body bushings in gear pumps of this type. Fig. 3 illustrates this second embodiment of this invention wherein the same reference numerals have been applied to this figure as used in conjunction with Figs. 1 and 2 with the exception of numeral 48. It can be understood that the axially movable, pressure loaded, bushings function in this embodiment in exactly the same manner as in the embodiment of Figs. 1 and 2.

In this embodiment, however, it can be seen that the passages 38 and 39, utilized to fill the gear tooth pockets, are in the fixed or body bushings 15 and 18 and communicate with the valving system 40 through an axially disposed conduit 48 formed in the drive shaft 19, the operation of the gear tooth passages is exactly the same as that disclosed in Fig. 1 with the exception that the available intermediate pressure for filling the gear tooth pockets is conducted through the passage 48 of the driving shaft 19.

In operation of either of these embodiments it will be understood that when the pressure in the seal chambers 38 and 39 reaches a predetermined value the valve system 40 will tend to open thus establishing a maximum loading value and at the same time permitting a restricted return flow of fluid to the inlet side of the pump. This predetermined maximum pressure will be sufficient to properly fill the gear teeth, provide proper lubrication of the bushings and salvage some of the flow from the annular recesses adjacent the gear side faces.

Where herein the various parts of this invention have been referred to as being located in the right or left position, it will be understood that this is done solely for the purpose of facilitating description and that such references relate only to the relative position to the parts as shown in the accompanying drawings.

While only two embodiments of this invention have been shown and described, it will be understood that many changes and modifications may be made therein without departing from the spirit or scope of the invention.

I claim:

1. In an intermeshing gear pump, a housing having an inlet port and a discharge port formed therein, a pair of intermeshing pumping gears journalled in said housing and arranged to force liquid from said inlet out of said housing through said outlet, a pair of bushings associated with said gears and having faces adapted to engage the adjacent gear side faces in substantially sealing relationship, means for establishing a zone of intermediate pressure of less than discharge pressure but greater than inlet pressure, means in said bushings for communicating said intermediate pressure to the gear tooth pockets for filling same during operation of said pump.

2. In an intermeshing gear pump, a housing having an inlet port and a discharge port formed therein, a pair of intermeshing pump gears journalled in said housing and arranged to force liquid from said inlet out of said housing through said outlet, a pair of bushings associated with said gears and having faces adapted to engage the adjacent gear side faces in substantially sealing relationship, means for establishing a zone of intermediate pressure of less than discharge pressure but greater than inlet pressure in a chamber defined by a portion of said housing and a portion of said bushings, means for communicating said intermediate pressure to the gear tooth pockets for filling same during operation of said pump, said last-mentioned means comprising a passage formed in said bushings and communicating with said gear tooth pockets adjacent the inlet port of the pump for filling the same during operation of said pump.

3. In an intermeshing gear pump, a housing having an inlet port and a discharge port formed therein, a pair of intermeshing pump gears journalled in said housing and arranged to force liquid from said inlet out of said housing through said outlet, a pair of bushings associated with said gears and having faces adapted to engage the adjacent gear side faces in substantially sealing relationship, means for establishing a zone of intermediate pressure of less than discharge pressure but greater than inlet pressure, said means comprising, means defining a chamber including a portion of said housing and a portion of said bushings, means defining a restricted flow path for directing fluid pressure generated by said gears into said chamber, and means for regulating the value of said intermediate pressure in said chamber, and means in one of said bushings for communicating said intermediate pressure to the gear tooth pockets adjacent the inlet port of the pump for filling same during operation of said pump.

4. In an intermeshing gear pump, a housing having an inlet port and a discharge port formed therein, a pair of intermeshing pump gears journalled in said housing and arranged to force liquid from said inlet out of said housing through said outlet, an axially movable bushing and a fixed bushing, the end portions of said bushings being in spaced relationship with a portion of said housing and forming together with said housing a seal chamber, said bushings being engageable with a gear side face in substantially sealing relationship, means for establishing intermediate pressure less than discharge pressure but greater than inlet pressure in said seal chamber, and means for filling said gear tooth pockets with said intermediate pressure, including passages defined in one of said bushings and communicating with the gear tooth pockets adjacent the inlet port of the pump and said intermediate pressure.

5. A pump according to claim 4 wherein said passage is defined in said axially movable bushing and communicates with said gear tooth pockets and said intermediate pressure.

6. A pump according to claim 4 wherein said passage is defined in said fixed bushing and communicates with said gear tooth pockets and said intermediate pressure.

7. In a liquid pressure generating pump of the type including a housing containing intermeshing gears, axially movable bushings and fixed bushings, each of said bushings being radially outwardly flanged with a forward surface thereof engageable with the side faces of said gears and each having axially extending tubular portions of smaller diameter than said flanges, said axially movable bushings being subject to discharge pressure to maintain sealing engagement with said gear side faces during operation of said pump, and means for establishing a zone of an intermediate pressure of less than discharge pressure and greater than inlet pressure adjacent the terminals of said tubular portions and for filling the pockets of said gear teeth with said intermediate pressure from said zone whereby said pump maintains efficient operation under even exceedingly low pressure inlet conditions, said last-named means comprising relief recesses disposed inwardly of the roots of the gear teeth and communicating with the terminals of said axially extending tubular portions effective to permit a flow of a small quantity of pressure generated by said gears to said terminals, means for regulating said pressure at said terminals at said intermediate value, and means in said bushings for communicating said intermediate pressure to said gear tooth pockets.

8. A pump according to claim 7 wherein said means for communicating said pressure at the terminals of said bushings comprises passages defined in said bushings and communicating with said gear tooth pockets and said intermediate pressure.

9. A pump according to claim 8 wherein said passages are formed in said axially movable bushings.

10. A pump according to claim 8 wherein said passages are formed in said fixed bushings.

References Cited in the file of this patent

UNITED STATES PATENTS

| | | |
|---|---|---|
| 1,252,160 | Pagel | Jan. 1, 1918 |
| 1,645,967 | Patterson | Oct. 18, 1927 |
| 1,799,237 | Jensen | Apr. 7, 1931 |
| 1,837,446 | Kauffman | Dec. 22, 1931 |
| 1,937,367 | Vickers | Nov. 28, 1933 |
| 1,985,748 | Svenson | Dec. 25, 1934 |
| 2,029,742 | Sieverts | Feb. 4, 1936 |
| 2,212,994 | Vrolix | Aug. 27, 1940 |
| 2,221,412 | Rose | Nov. 12, 1940 |
| 2,236,980 | Ungar | Apr. 1, 1941 |
| 2,293,126 | Fersing | Aug. 18, 1942 |
| 2,301,496 | Aldrich | Nov. 10, 1942 |
| 2,310,078 | Herman | Feb. 2, 1943 |
| 2,391,072 | Pugh | Dec. 18, 1945 |
| 2,420,622 | Roth et al. | May 13, 1947 |
| 2,544,144 | Ellis | Mar. 6, 1951 |
| 2,624,287 | Ilyin | Jan. 6, 1953 |
| 2,684,637 | Erikson | July 27, 1954 |

FOREIGN PATENTS

| | | |
|---|---|---|
| 325,849 | Germany | Sept. 21, 1920 |